(12) United States Patent
Freeman et al.

(10) Patent No.: US 11,085,302 B2
(45) Date of Patent: Aug. 10, 2021

(54) BLADE TIP FOR CERAMIC MATRIX COMPOSITE BLADE

(71) Applicants: Rolls-Royce North American Technologies, Inc., Indianapolis, IN (US); Rolls-Royce High Temperature Composites Inc., Cypress, CA (US)

(72) Inventors: Ted J. Freeman, Danville, IN (US); Jeremy P. Roehm, Plainfield, IN (US); Robert J. Shinavski, Mission Viejo, CA (US)

(73) Assignees: Rolls-Royce North American Technologies Inc., Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 298 days.

(21) Appl. No.: 15/926,585

(22) Filed: Mar. 20, 2018

(65) Prior Publication Data

US 2019/0292916 A1  Sep. 26, 2019

(51) Int. Cl.
| | |
|---|---|
| F01D 5/14 | (2006.01) |
| F01D 11/08 | (2006.01) |
| F01D 5/28 | (2006.01) |
| B23P 15/04 | (2006.01) |
| F01D 5/20 | (2006.01) |
| F01D 5/22 | (2006.01) |

(52) U.S. Cl.
CPC ............ *F01D 5/147* (2013.01); *F01D 5/282* (2013.01); *F01D 11/08* (2013.01); *B23P 15/04* (2013.01); *F01D 5/20* (2013.01); *F01D 5/22* (2013.01); *F01D 5/284* (2013.01); *F05D 2220/32* (2013.01); *F05D 2240/304* (2013.01); *F05D 2240/307* (2013.01); *F05D 2300/6033* (2013.01)

(58) Field of Classification Search
None
See application file for complete search history.

(56) References Cited

U.S. PATENT DOCUMENTS

| | | | |
|---|---|---|---|
| 4,411,597 A * | 10/1983 | Koffel | B23P 6/005 416/224 |
| 5,083,903 A | 1/1992 | Erdmann | |
| 6,926,495 B2 * | 8/2005 | Diakunchak | F01D 5/225 415/12 |
| 8,210,803 B2 | 7/2012 | Schaff et al. | |
| 8,944,768 B2 | 2/2015 | Hunt et al. | |
| 9,752,441 B2 | 9/2017 | Hildebrand et al. | |
| 9,771,870 B2 | 9/2017 | Dierksmeier | |
| 9,845,688 B2 | 12/2017 | Thomas et al. | |

(Continued)

FOREIGN PATENT DOCUMENTS

| | | |
|---|---|---|
| GB | 2378733 A | 2/2003 |
| WO | 2017074372 A1 | 5/2017 |

OTHER PUBLICATIONS

Extended European Search Report, European Application No. 19158182.6-1006, dated Sep. 9, 2019, 9 pages.

*Primary Examiner* — Ninh H. Nguyen
*Assistant Examiner* — Jason Fountain
(74) *Attorney, Agent, or Firm* — Barnes & Thornburg LLP (57) ABSTRACT

Turbine blades for use in gas turbine engines are disclosed herein. Each blade includes an airfoil and a protective crown. The airfoil includes ceramic matrix composite materials. The protective crown includes ceramic-containing materials and is mounted to a radially-outer end portion of the airfoil.

18 Claims, 2 Drawing Sheets

(56) References Cited

U.S. PATENT DOCUMENTS

| | | |
|---|---|---|
| 10,563,522 B2 * | 2/2020 | Thomas .................... F01D 5/18 |
| 2005/0058539 A1 * | 3/2005 | Diakunchak ............ F01D 5/225 |
| | | 415/173.1 |
| 2012/0034101 A1 * | 2/2012 | James ....................... F01D 5/20 |
| | | 416/96 R |
| 2014/0199174 A1 * | 7/2014 | Roberts, III ............ F01D 5/282 |
| | | 416/232 |
| 2015/0003963 A1 | 1/2015 | Taketa |
| 2016/0177743 A1 * | 6/2016 | Thomas ................. F01D 5/282 |
| | | 416/230 |
| 2016/0177745 A1 | 6/2016 | Uskert et al. |
| 2016/0222802 A1 * | 8/2016 | Holowczak ........... F01D 5/3007 |
| 2017/0138597 A1 | 5/2017 | Freeman et al. |
| 2018/0298765 A1 * | 10/2018 | Beyer .................... F01D 5/284 |

\* cited by examiner

BLADE TIP FOR CERAMIC MATRIX COMPOSITE BLADE

FIELD OF THE DISCLOSURE

The present disclosure relates generally to blades used in gas turbine engines, and more specifically to turbine blades used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in rotating blades of the turbine. A blade track or other structure arranged radially outward of the rotating blades may block combustion products from passing over the blades without causing the blades to rotate, thereby contributing to lost performance within the gas turbine engine. Interaction of the rotating blades with the blade track or other structure and the environment during engine operation may cause degradation of the blades. As such, minimizing blade degradation remains an area of interest.

SUMMARY

The present disclosure may comprise one or more of the following features and combinations thereof.

According to one aspect of the present disclosure, a turbine blade adapted for use in a gas turbine engine may include an airfoil, a protective crown, and a crown retainer. The airfoil may include ceramic matrix composite materials having ceramic-containing reinforcements suspended in ceramic-containing matrix material. The airfoil may have a radially-inner end portion, a radially-outer end portion, and a body portion that extends from the radially-inner end portion to the radially-outer end portion. The protective crown may include ceramic-containing materials, and the protective crown may be mounted to the radially-outer end portion of the airfoil. The protective crown may be configured to provide a radially-outermost surface of the turbine blade such that the protective crown may be positioned to engage a blade track or other structure radially outward of the airfoil upon use of the turbine blade in a gas turbine engine so that the ceramic matrix composite materials of the airfoil are protected from rub that could remove barrier coatings and expose the ceramic matrix materials of the airfoil to the environment which can damage the ceramic matrix materials of the airfoil. The crown retainer may be configured to block motion of the protective crown in the radial direction relative to the airfoil. The crown retainer may include a flange incorporated into either the airfoil or the protective crown that may be received in a flange-receiving channel formed in the other of the airfoil or the protective crown.

In some embodiments, the protective crown may be shaped to include a tip portion that extends radially outward of the airfoil to provide the radially-outermost surface of the turbine blade and a tip mount that radially overlaps the radially-outer end portion of the airfoil. The flange of the crown retainer may be incorporated into the protective crown, and the flange-receiving channel of the crown retainer may be formed in the airfoil. The tip mount of the protective crown may be received in a mount aperture extending in the radial direction through the radially-outer end portion of the airfoil, and the flange-receiving channel may extend into the radially-outer end portion or the body portion of the airfoil from the mount aperture. The tip mount of the protective crown may be received in the mount aperture of the airfoil, and the flange may extend outwardly from the tip mount into the flange-receiving channel. The tip portion may include a squealer tip having a first side rail portion, a second side rail portion, and a cavity extending between the first side rail portion and the second side rail portion.

In some embodiments, the flange of the crown retainer may be incorporated into the airfoil, and the flange-receiving channel of the crown retainer may be formed in the protective crown. The radially-outer end portion of the airfoil may include a central stud extending radially outward of the body portion of the airfoil, and the flange may extend outwardly from the central stud. The tip mount of the protective crown may include a mount aperture that receives the central stud of the airfoil, and the flange-receiving channel may extend into the tip mount from the mount aperture. The tip portion may include a squealer tip having a first side rail portion, a second side rail portion, and a cavity extending between the first side rail portion and the second side rail portion. Additionally, in some embodiments, the protective crown may include a monolithic ceramic protective crown.

According to another aspect of the present disclosure, a turbine blade adapted for use in a gas turbine engine may include an airfoil, a protective crown, and a crown retainer. The airfoil may include ceramic matrix composite materials. The airfoil may have a radially-inner end portion, a radially-outer end portion, and a body portion that extends between the radially-inner and radially-outer end portions. The protective crown may include ceramic-containing materials, and the protective crown may be mounted to the radially-outer end portion of the airfoil to provide a radially-outermost surface of the turbine blade. The protective crown may be configured to protect the ceramic matrix composite materials of the airfoil from degradation due to interaction with a structure radially outward of the airfoil upon use of the turbine blade in a gas turbine engine. The crown retainer may be configured to block motion of the protective crown relative to the airfoil. The crown retainer may include a flange formed in one of the airfoil and the protective crown and a flange-receiving channel formed in the other of the airfoil and the protective crown.

In some embodiments, the protective crown may be shaped to include a tip mount that radially overlaps the radially-outer end portion of the airfoil and a shrouded tip portion that extends radially outward of the airfoil and has a plurality of knives that provide knife tips of the turbine blade. The flange of the crown retainer may be formed in the protective crown, the flange-receiving channel of the crown retainer may be formed in the airfoil, and the flange of the protective crown may extend radially inward of the tip mount away from the shrouded tip portion. The flange-receiving channel may extend in the radial direction through the radially-outer end portion of the airfoil and into the body portion of the airfoil, and at least a portion of the tip mount and the flange may be received in the flange-receiving channel. The crown retainer may include a retainer member that secures the flange to the body portion or the radially-outer end portion of the airfoil.

In some embodiments, the turbine blade may further include a second protective crown having ceramic-containing materials, and the second protective crown may be mounted to the radially-outer end portion of the airfoil to provide a radially-outermost surface of the turbine blade and configured to protect the ceramic matrix composite materials of the airfoil from degradation due to interaction with a structure radially outward of the airfoil upon use of the turbine blade in a gas turbine engine. The turbine blade may further include a second crown retainer configured to block motion of the second protective crown relative to the airfoil, and the second crown retainer may include a flange formed in one of the airfoil and the second protective crown and a flange-receiving channel formed in the other of the airfoil and the second protective crown. Additionally, in some embodiments, the protective crown may include a monolithic ceramic protective crown.

According to yet another aspect of the present disclosure, a method of making a turbine blade may include suspending ceramic-containing reinforcements in ceramic-containing matrix material to form an airfoil, forming an aperture in the airfoil that extends through a radially-outer end portion thereof, positioning a protective crown made from monolithic ceramic materials in the aperture, and co-processing the airfoil and the protective crown to form a crown retainer that blocks motion of the protective crown relative to the airfoil in the radial direction.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments illustrated in the drawings and specific language will be used to describe the same.

Figure 1:
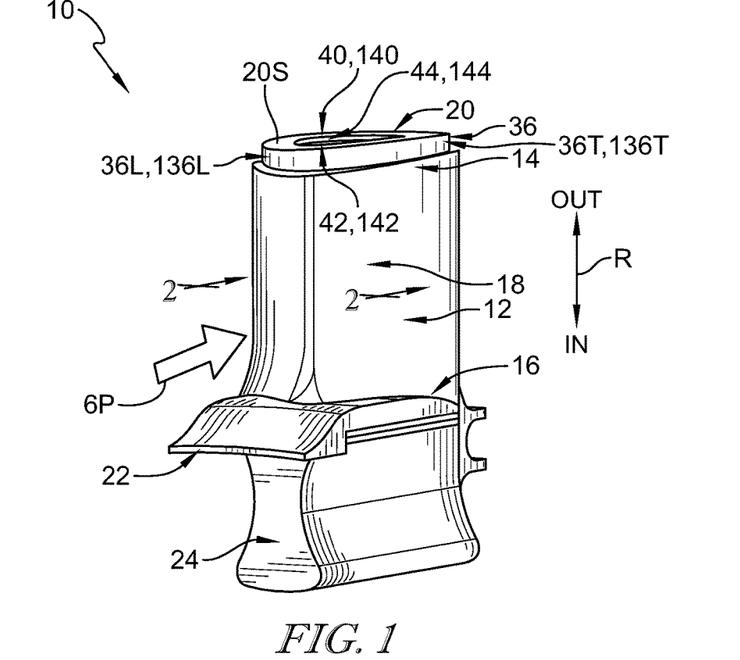
FIG. 1 is a perspective view of a turbine blade adapted for use in a gas turbine engine showing that the turbine blade includes an airfoil that comprises ceramic matrix composite materials suitable for use in high temperature environments and showing that the turbine blade includes a tip that extends from a radially-outer end of the airfoil away from the airfoil to form the radially-outer end of the turbine blade.

A blade 10 is adapted for use in a gas turbine engine is shown in FIG. 1. In some embodiments, the turbine blade 10 may be incorporated into one or more rotatable turbine wheel assemblies that are surrounded by a static structure arranged radially outward of the one or more turbine wheel assemblies. In those embodiments, the turbine blade 10 may interact with the static structure during operation of a gas turbine engine. For example, the turbine blade 10 may interact with a blade track of a turbine during operation of a gas turbine engine. In some cases, interaction with a blade track or other static structure may expose materials used to form the turbine blade 10 to the surrounding environment, thereby degrading those materials and the blade 10.

Figures 4, 5, 6:
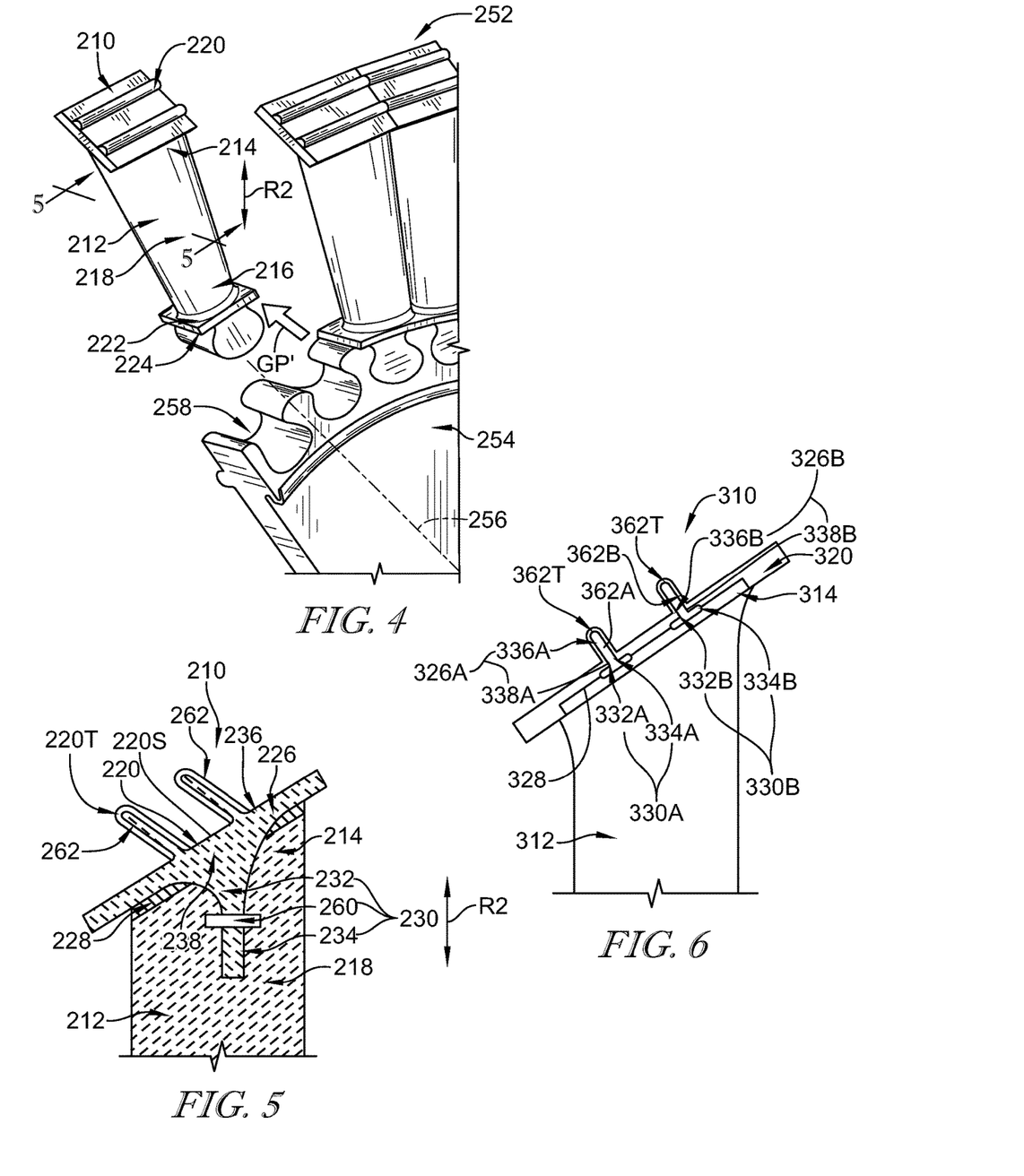
FIG. 4 is an exploded perspective view of part of a turbine wheel assembly adapted for use in a gas turbine engine showing that the turbine wheel assembly includes a turbine disk configured for rotation about a central axis and shrouded turbine blades each configured to be received by the turbine disk so that the turbine blades are coupled to the turbine disk for common rotation therewith.
FIG. 5 is a partial sectional view of one of the turbine blades of FIG. 4 taken along line 5-5 showing that the turbine blade includes an airfoil, a protective crown mounted to a radially-outer end portion of the airfoil that has a pair of knives at least partially providing a knife tip included in a tip shroud of the turbine blade, and a crown retainer configured to block motion of the protective crown relative to the airfoil, and showing that the crown retainer includes a flange formed in the protective crown, a flange-receiving channel formed in the airfoil, and a retaining member or pin that secures the flange to the airfoil.
FIG. 6 is a sectional view of another turbine blade adapted for use in a turbine wheel assembly of a gas turbine engine showing that the turbine blade includes an airfoil and a pair of protective crowns mounted to a radially-outer end portion of the airfoil.

The illustrative turbine blade 10 includes an airfoil 12 that is shaped to interact with hot, high-pressure gasses (e.g., combustion products) discharged along a primary gas path GP during operation of a gas turbine engine, as shown in FIG. 1. The airfoil 12 includes a radially-outer end portion 14, a radially-inner end portion 16 spaced from the end portion 14 in the radial direction indicated by arrow R, and a body portion 18 that extends from the radially-outer end portion 14 to the radially-inner end portion 16. A tip 20 of the turbine blade 10 is coupled to the radially-outer end portion 14 of the airfoil 12 and configured to interact with a blade track or other static structure. A platform 22 of the turbine blade 10 is coupled to the radially-inner portion 16 of the airfoil 12. A root 24 of the turbine blade 10 extends radially inward of the platform 22 and is configured for receipt by a turbine disk (an example of which is shown in FIG. 4) of a turbine wheel assembly.

Figure 2:
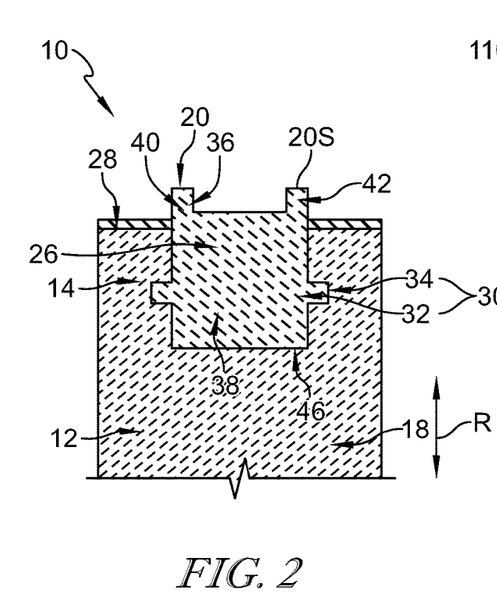
FIG. 2 is a partial sectional view of the turbine blade of FIG. 1 taken along line 2-2 showing that the tip of the turbine blade is included in a protective crown that provides means for protecting the ceramic matrix composite material of the airfoil from degradation caused by rub with a structure radially outward of the airfoil, and showing that the protective crown is held in place relative to the airfoil by a flange retained in a flange-receiving channel formed inside the airfoil.

Referring now to FIG. 2, the turbine blade 10 illustratively includes a protective crown 26 that is received by the airfoil 12. The protective crown 26 is mounted to the radially-outer end portion 14 of the airfoil 12. In the illustrative embodiment, the protective crown 26 provides a radially-outermost surface 20S of the turbine blade 10 (i.e., the radially-outermost surface 20S defined by the tip 20). Consequently, the protective crown 26 is positioned to engage or contact a blade track or other static structure radially outward of the airfoil 12 upon use of the turbine blade 10 in a gas turbine engine. Due to the positioning of the protective crown 26, materials used to form the airfoil 12 are protected from rub or interference that could remove barrier coatings 28 of the airfoil 12 and expose the materials to the surrounding environment, thereby damaging the materials. The protective crown 26 therefore protects the airfoil 12 from degradation during use of the turbine blade 10 in a gas turbine engine.

In the illustrative embodiment, a crown retainer 30 of the turbine blade 10 blocks motion of the protective crown 26 in the radial direction indicated by arrow R relative to the airfoil 12, as shown in FIG. 2. The crown retainer 30 includes a flange 32 formed in, or otherwise incorporated into, the protective crown 26. Additionally, the crown retainer 30 includes a flange-receiving channel 34 formed in, or otherwise incorporated into, the airfoil 12. When the flange 32 is received in the flange-receiving channel 34 as shown in FIG. 2, the crown retainer 30 operatively secures the protective crown 26 to the radially-outer end portion 14 of the airfoil 12.

The airfoil 12 is formed from ceramic matrix composite materials. In some embodiments, the ceramic matrix composite materials of the airfoil 12 may include ceramic-containing reinforcements suspended in ceramic-containing matrix material, for example as silicon-carbide reinforcements suspended in silicon-carbide matrix material. In some designs, an environmental barrier coating 28 may be applied to the airfoil and/or other parts of the turbine blade 10. In any case, regardless of the presence of the barrier coating 28 or other protective coating, the ceramic matrix composite materials of the airfoil 12 can be susceptible to damage from exposure to the environment of a turbine during operation of a gas turbine engine.

The protective crown 26 is configured to provide means for blocking exposure of the ceramic matrix composite materials of the airfoil 12 to the gas path environment due to tip rub as suggested in FIG. 1. The protective crown 26 includes ceramic-containing materials. In some embodiments, the protective crown 26 is formed from monolithic ceramic materials. In other embodiments, the protective crown 26 may be made from ceramic matrix composite materials designed to for exposure to materials in the gas path.

Given the illustrative positioning of the protective crown 26 radially outward of the airfoil 12 as shown in FIG. 2, the protective crown 26, rather than the airfoil 12, is arranged to interface directly with a blade track or other static structure. The airfoil 12 is therefore shielded from rub or interference that may occur between the protective crown 26 and the static structure along that interface during operation of a gas turbine engine. As a result, the ceramic matrix composite materials of the airfoil 12 may be protected from environmental degradation to a greater degree than might otherwise be the case were a different configuration employed.

The illustrative protective crown 26 is shaped to include a tip portion 36 and a tip mount 38. When the protective crown 26 is received by the airfoil 12 as shown in FIG. 2, the tip portion 36 extends radially outward of the radially-outer end portion 14 of the airfoil 12 to provide the tip 20 and the radially-outermost surface 20S. Additionally, when the protective crown 26 is received by the airfoil 12, the tip mount 38 radially overlaps the radially-outer end portion 14 of the airfoil 12.

In the illustrative embodiment, the tip 20 defined by the tip portion 36 of the protective crown 26 is embodied as, or otherwise includes, a squealer tip, as best seen in FIGS. 1 and 2. The tip portion 36 may therefore be said to be embodied as, or otherwise include, a squealer tip portion. In any case, the tip portion 36 includes a side rail portion 40 and a side rail portion 42 arranged opposite the side rail portion 40. A cavity 44 extends between the side rail portions 40, 42 between a leading edge 36L and a trailing edge 36T of the tip portion 36. Each of the side rail portions 40, 42 illustratively has a rectangular cross-sectional shape. However, in other embodiments, the cross-sectional shapes of the side rail portions 40, 42 may take the shapes of other suitable geometric forms.

In the illustrative embodiment, the tip mount 38 of the protective crown 26 is received by the airfoil 12 to couple the protective crown 26 to the airfoil 12, as shown in FIG. 2. The tip mount 38 illustratively has a rectangular cross-sectional shape. However, in other embodiments, the cross-sectional shape of the tip mount 38 may take the shape of other suitable geometric forms. In any case, the flange 32 of the protective crown 26 extends outwardly or exteriorly of the tip mount 38 and illustratively has a rectangular cross-sectional shape. In other embodiments, the cross-sectional shape of the flange 32 may take the shape of other suitable geometric forms.

The illustrative airfoil 12 includes a mount aperture 46 that is sized to receive the tip mount 38 of the protective crown 26, as shown in FIG. 2. The mount aperture 46 extends in the radial direction indicated by arrow R through the radially-outer end portion 14 of the airfoil 12 toward the body portion 18. The flange-receiving channel 34 extends into the radially-outer end portion 14 or the body portion 18 from the mount aperture 46. Thus, the flange-receiving channel 34 is located exteriorly or outwardly of the mount aperture 46.

Figure 3:
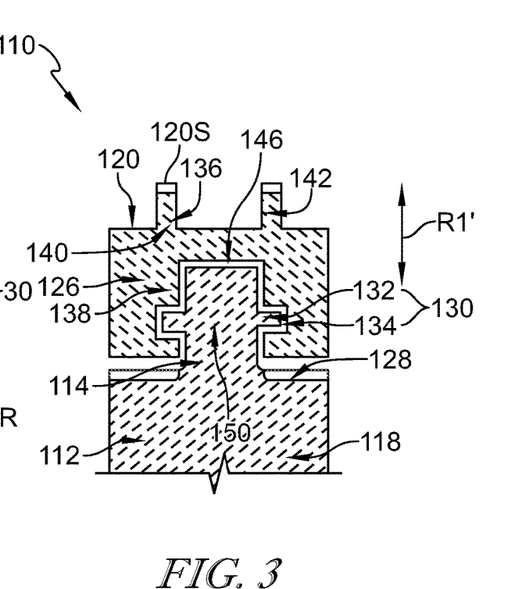
FIG. 3 is a partial sectional view of another turbine blade adapted for use in a gas turbine engine showing that the turbine blade includes a ceramic matrix composite airfoil, a protective crown, and a crown retainer similar to the turbine blade of FIG. 2, and showing that the crown retainer includes a flange formed in the airfoil and a flange-receiving channel formed in the protective crown.

Referring now to FIG. 3, a turbine blade 110 similar to the turbine blade 10 depicted in FIGS. 1 and 2 and described above is shown. The illustrative turbine blade 110 includes a protective crown 126 that receives an airfoil 112 of the turbine blade 110. The protective crown 126 is mounted to a radially-outer end portion 114 of the airfoil 112. In the illustrative embodiment, the protective crown 126 provides a radially-outermost surface 120S of the turbine blade 110 (i.e., the radially-outermost surface 120S defined by a tip 120 of the turbine blade 110). Consequently, the protective crown 126 is positioned to engage or contact a blade track or other static structure radially outward of the airfoil 112 upon use of the turbine blade 110 in a gas turbine engine. Due to the positioning of the protective crown 126, materials used to form the airfoil 112 are protected from rub or interference that could remove barrier coatings 128 of the airfoil 112 and expose the materials to the surrounding environment, thereby damaging the materials. The protective crown 126 therefore protects the airfoil 112 from degradation during use of the turbine blade 110 in a gas turbine engine.

In the illustrative embodiment, a crown retainer 130 of the turbine blade 110 blocks motion of the protective crown 126 in the radial direction indicated by arrow R1 relative to the airfoil 112, as shown in FIG. 3. The crown retainer 130 includes a flange 132 formed in, or otherwise incorporated into, the airfoil 112. Additionally, the crown retainer 130 includes a flange-receiving channel 134 formed in, or otherwise incorporated into, the protective crown 126. When the flange 132 is received in the flange-receiving channel 134 as shown in FIG. 3, the crown retainer 130 operatively secures the protective crown 126 to the radially-outer end portion 114 of the airfoil 112.

In the illustrative embodiment, the airfoil 112 is formed from ceramic matrix composite materials. In some embodiments, the ceramic matrix composite materials of the airfoil 112 may include ceramic-containing reinforcements suspended in ceramic-containing matrix material. In any case, regardless of the presence of the barrier coating 128 or other protective coating, the ceramic matrix composite materials of the airfoil 112 can be susceptible to damage from exposure to the environment of a turbine during operation of a gas turbine engine.

In the illustrative embodiment, the protective crown 126 includes ceramic-containing materials. In some embodiments, the protective crown 126 is formed from monolithic ceramic material. In those embodiments, the protective crown 126 may be said to be embodied as, or otherwise include, a monolithic ceramic protective crown.

Given the illustrative positioning of the protective crown 126 radially outward of the airfoil 112 as shown in FIG. 3, the protective crown 126, rather than the airfoil 112, is arranged to interface directly with a blade track or other static structure. The airfoil 112 is therefore shielded from rub or interference that may occur between the protective crown 126 and the static structure along that interface during operation of a gas turbine engine. As a result, the ceramic matrix composite materials of the airfoil 112 may be protected from environmental degradation to a greater degree than might otherwise be the case were a different configuration employed.

The illustrative protective crown 126 is shaped to include a tip portion 136 and a tip mount 138. When the protective crown 126 receives the airfoil 112 as shown in FIG. 3, the tip portion 136 extends radially outward of the radially-outer end portion 114 of the airfoil 112 to provide the tip 120 and the radially-outermost surface 120S. Additionally, when the protective crown 126 receives the airfoil 112, the tip mount 138 radially overlaps the radially-outer end portion 114 of the airfoil 112.

In the illustrative embodiment, the tip 120 defined by the tip portion 136 of the protective crown 126 is embodied as, or otherwise includes, a squealer tip, as best seen in FIGS. 1 and 3. The tip portion 136 may therefore be said to be embodied as, or otherwise include, a squealer tip portion. In any case, the tip portion 136 includes a side rail portion 140 and a side rail portion 142 arranged opposite the side rail portion 140. A cavity 144 extends between the side rail portions 140, 142 between a leading edge 136L and a trailing edge 136T of the tip portion 136. Each of the side rail portions 140, 142 illustratively has a rectangular cross-sectional shape. However, in other embodiments, the cross-sectional shapes of the side rail portions 140, 142 may take the shapes of other suitable geometric forms.

In the illustrative embodiment, the tip mount 138 of the protective crown 126 receives the airfoil 112 to couple the protective crown 126 to the airfoil 112, as shown in FIG. 3. The tip mount 138 includes a mount aperture 146 that extends radially through the tip mount 138 and is sized to receive the airfoil 112. The flange-receiving channel 134 extends into the tip mount 138 from the mount aperture 146. Thus, the flange-receiving channel 134 is located exteriorly or outwardly of the mount aperture 146.

In the illustrative embodiment, the radially-outer end portion 114 of the airfoil 112 includes, or is otherwise embodied as, a central stud 150 that extends radially outward of a body portion 118 of the airfoil 112, as shown in FIG. 3. The central stud 150 illustratively has a rectangular cross-sectional shape. However, in other embodiments, the cross-sectional shape of the central stud 150 may take the shape of other suitable geometric forms. In any case, the central stud 150 is sized to be received in the mount aperture 146 of the protective crown 126. The flange 132 of the airfoil 112 extends outwardly from, and is located exteriorly of, the central stud 150. The flange 132 illustratively has a rectangular cross-sectional shape. However, in other embodiments, the cross-sectional shape of the flange 132 may take the shape of other suitable geometric forms.

Referring now to FIG. 4, a turbine wheel assembly 252 adapted for use in a turbine of a gas turbine engine includes turbine blades 210 and a turbine disk 254. The turbine disk 254 is configured for rotation about a central axis 256. The turbine blades 210 are coupled to the turbine disk 254 for common rotation with the disk 254 about the central axis 256. The turbine blades 210 are substantially identical to one another and circumferentially spaced apart about the central axis 256.

Each of the illustrative turbine blades 210 includes an airfoil 212 that is shaped to interact with hot, high-pressure gasses (e.g., combustion products) discharged along a primary gas path GP' during operation of a gas turbine engine, as shown in FIG. 4. Each airfoil 212 includes a radially-outer end portion 214, a radially-inner end portion 216 spaced from the end portion 214 in the radial direction indicated by arrow R2, and a body portion 218 that extends from the radially-outer end portion 214 to the radially-inner end portion 216. A tip shroud 220 of each turbine blade 210 is coupled to the radially-outer end portion 214 of each airfoil 212 and configured to interact with a blade track or other static structure. A platform 222 of each turbine blade 210 is coupled to the radially-inner portion 216 of each airfoil 212. A root 224 of each turbine blade 210 extends radially inward of the platform 222 and is configured for receipt by a corresponding slot 258 formed in the turbine disk 254.

Referring now to FIG. 5, each of the illustrative turbine blades 210 includes a protective crown 226 that is received by the airfoil 212 of the turbine blade 210. The protective crown 226 is mounted to the radially-outer end portion 214 of the airfoil 212. In the illustrative embodiment, the protective crown 226 provides at least a portion of the tip shroud 220 and defines a radially-outermost surface 220S of the turbine blade 210. Consequently, the protective crown 226 is positioned to engage or contact a blade track or other static structure radially outward of the airfoil 212 upon use of the turbine blade 210 in a gas turbine engine. Due to the positioning of the protective crown 226, materials used to form the airfoil 212 are protected from rub or interference that could remove barrier coatings 228 of the airfoil 212 and expose the materials to the surrounding environment, thereby damaging the materials. The protective crown 226 therefore protects the airfoil 212 from degradation during use of the turbine blade 210 in a gas turbine engine.

In the illustrative embodiment, a crown retainer 230 of the turbine blade 210 blocks motion of the protective crown 226 in the radial direction indicated by arrow R2 relative to the airfoil 212, as shown in FIG. 5. The crown retainer 230 includes a flange 232 formed in, or otherwise incorporated into, the protective crown 226. The crown retainer 230 also includes a flange-receiving channel 234 formed in, or otherwise incorporated into, the airfoil 212. When the flange 232 is received in the flange-receiving channel 234 as shown in FIG. 5, a retaining member 260 included in the crown retainer 230 operatively secures the flange 232 of the protective crown 226 to the radially-outer end portion 214 or the body portion 218 of the airfoil 212.

In the illustrative embodiment, the airfoil 212 is formed from ceramic matrix composite materials. In some embodiments, the ceramic matrix composite materials of the airfoil 212 may include ceramic-containing reinforcements suspended in ceramic-containing matrix material. In any case, regardless of the presence of the barrier coating 228 or other protective coating, the ceramic matrix composite materials of the airfoil 212 can be susceptible to damage from exposure to the environment of a turbine during operation of a gas turbine engine.

In the illustrative embodiment, the protective crown 226 includes ceramic-containing materials. In some embodiments, the protective crown 226 is formed from monolithic ceramic material. In those embodiments, the protective crown 226 may be said to be embodied as, or otherwise include, a monolithic ceramic protective crown.

Given the illustrative positioning of the protective crown 226 radially outward of the airfoil 212 as shown in FIG. 5, the protective crown 226, rather than the airfoil 212, is arranged to interface directly with a blade track or other static structure. The airfoil 212 is therefore shielded from rub or interference that may occur between the protective crown 226 and the static structure along that interface during operation of a gas turbine engine. As a result, the ceramic matrix composite materials of the airfoil 212 may be protected from environmental degradation to a greater degree than might otherwise be the case were a different configuration employed.

The illustrative protective crown 226 is shaped to include a shrouded tip portion 236 and a tip mount 238. When the protective crown 226 is received by the airfoil 212 as shown in FIG. 5, the shrouded tip portion 236 extends radially outward of the radially-outer end portion 214 of the airfoil 212 to provide at least a portion of the tip shroud 220 and the radially-outermost surface 220S. Additionally, when the protective crown 226 is received by the airfoil 212, the tip mount 238 radially overlaps the radially-outer end portion 214 of the airfoil 212.

In the illustrative embodiment, the shrouded tip portion 236 includes a plurality of knives 262 as shown in FIG. 5. The knives 262 provide knife tips 220T of the turbine blade 210 that may be included in, or otherwise form a portion of, the tip shroud 220. The knives 262 illustratively include two knives. In other embodiments, however, the knives 262 may include another suitable number of knives.

In the illustrative embodiment, the flange-receiving channel 234 extends in the radial direction indicated by arrow R2 through the radially-outer end portion 214 and into the body portion 218, as shown in FIG. 5. At least a portion of the tip mount 238 and the flange 232 of the protective crown 226 are received in the flange-receiving channel 234 when the protective crown 226 is secured to the airfoil 212 by the crown retainer 230. The flange 232, which may be embodied as, or otherwise include, an elongated attachment stem, extends radially inward of the tip mount away from the tip shroud 220 when the protective crown 226 is secured to the airfoil 212 by the crown retainer 230.

Referring now to FIG. 6, a turbine blade 310 similar to each of the turbine blades 210 depicted in FIGS. 4 and 5 and discussed above is shown. The illustrative turbine blade 310 includes a pair of protective crowns 326A, 326B that are mounted to a radially-outer end portion 314 of an airfoil 312. In the illustrative embodiment, the protective crowns 326A, 326B are separate from, and held by, a tip shroud 320 of the blade 310. Consequently, the protective crowns 326A, 326B are positioned to engage or contact a blade track or other static structure radially outward of the airfoil 312 upon use of the turbine blade 310 in a gas turbine engine. Due to the positioning of the protective crowns 326A, 326B, materials used to form the airfoil 312 are protected from rub or interference that could remove barrier coatings 328 of the airfoil 312 and expose the materials to the surrounding environment, thereby damaging the materials. The protective crowns 326A, 326B therefore protect the airfoil 312 from degradation during use of the turbine blade 310 in a gas turbine engine.

In the illustrative embodiment, crown retainers 330A, 330B of the turbine blade 310 block motion of the respective protective crowns 326A, 326B relative to the airfoil 312, as shown in FIG. 6. The crown retainer 330A includes a flange 332A formed in, or otherwise incorporated into, the protective crown 326A. The crown retainer 330A also includes a flange-receiving channel 334A formed in, or otherwise incorporated into, the airfoil 312 or the tip shroud 320. Similarly, the crown retainer 330B includes a flange 332B formed in, or otherwise incorporated into, the protective crown 326B and a flange-receiving channel 334B formed in, or otherwise incorporated into, the airfoil 312 or the tip shroud 320. When the flanges 332A, 332B of the respective protective crowns 326A, 326B are received in the flange-receiving channels 334A, 334B of the airfoil 312, the protective crowns 326A, 326B are operatively secured to the airfoil 312 by the crown retainers 330A, 330B.

In the illustrative embodiment, the airfoil 312 is formed from ceramic matrix composite materials. In some embodiments, the ceramic matrix composite materials of the airfoil 312 may include ceramic-containing reinforcements suspended in ceramic-containing matrix material. In any case, regardless of the presence of the barrier coating 328 or other protective coating, the ceramic matrix composite materials of the airfoil 312 can be susceptible to damage from exposure to the environment of a turbine during operation of a gas turbine engine.

In the illustrative embodiment, each of the protective crowns 326A, 326B includes ceramic-containing materials. In some embodiments, each of the protective crowns 326A, 326B is formed from monolithic ceramic material. In those embodiments, each of the protective crowns 326A, 326B may be said to be embodied as, or otherwise include, a monolithic ceramic protective crown.

Given the illustrative positioning of the protective crowns 326A, 326B radially outward of the radially-outer end portion 314 of the airfoil 312 as shown in FIG. 6, the protective crowns 326A, 326B, rather than the airfoil 312, are arranged to interface directly with a blade track or other static structure. The airfoil 312 is therefore shielded from rub or interference that may occur between the protective crowns 326A, 326B and the static structure along that interface during operation of a gas turbine engine. As a result, the ceramic matrix composite materials of the airfoil 312 may be protected from environmental degradation to a greater degree than might otherwise be the case were a different configuration employed.

The illustrative protective crown 326A is embodied as, or otherwise includes, a T-shaped knife 362A that includes a shrouded tip portion 336A and a tip mount 338A as shown in FIG. 6. The tip portion 336A provides one knife tip 362T of the turbine blade 310 that is held by the tip shroud 320. The tip mount 338A interfaces with, and may radially overlap, the radially-outer end portion 314 of the airfoil 312 and/or the tip shroud 320.

The illustrative protective crown 326B is embodied as, or otherwise includes, a T-shaped knife 362B that includes a shrouded tip portion 336B and a tip mount 338B as shown in FIG. 6. The tip portion 336B provides another knife tip 362T of the turbine blade 310 that is held by the tip shroud 320. The tip mount 338B interfaces with, and may radially overlap, the radially-outer end portion 314 of the airfoil 312 and/or the tip shroud 320.

In the illustrative embodiment, the turbine blade 310 includes two protective crowns 326A, 326B and two corresponding crown retainers 330A, 330B. In other embodiments, however, the turbine blade 310 may include another suitable number of protective crowns and corresponding crown retainers.

In the illustrative embodiment, the flange-receiving channels 334A, 334B formed in the airfoil 312 are sized to receive the flanges 332A, 332B of the respective protective crowns 326A, 326B, as shown in FIG. 6. In some embodiments, portions of the tip mounts 338A, 338B of the protective crowns 326A, 326B may be received in the flange-receiving channels 334A, 334B. In other embodiments, however, the tip mounts 338A, 338B of the protective crowns 326A, 326B may be positioned outside of the flange-receiving channels 334A, 334B.

To improve gas turbine efficiency, combustor outlet temperatures may be elevated to improve cycle efficiency and power density. Incorporation of components formed from ceramic matrix composite (CMC) materials into the turbine section may offer the potential of reduced cooling requirements due to their higher temperature capability, as well as reduced engine weight due to their low density. Turbine blades (e.g., turbine blades 10, 110, 210, 310) may be one such component for which a ceramic matrix composite materials construction is envisioned for future engines.

CMC blades may interface with a static structure where a blade tip (e.g., tips 20, 120, 220, 320) contacts a seal segment or blade track segment. At this interface, the turbine blade may be required to rub into the static structure, which may rub the coating (e.g., barrier coating 28, 128, 228, 328) off the CMC material and allow the environment to attack the unprotected CMC material. To combat this issue, a monolithic ceramic insert (e.g., protective crowns 26, 126, 226, 336A, 336B) may be used to form the tip of the turbine blade.

In one example, a monolithic ceramic insert may replace a portion of the CMC material of the turbine blade and may contain features (e.g., the flanges 32, 232, 332A, 332B or the flange-receiving channel 134) that allow the surrounding CMC material to lock the monolithic ceramic insert in place. In that example, the insert may be fabricated to provide a flat tip or a squealer-style tip (e.g., the tip 20) for an unshrouded turbine blade.

In another example, a monolithic ceramic insert may replace the entire tip shroud of a shrouded blade (e.g., the tip shroud 220). The insert may have features (e.g., the flange 232, the flange-receiving channel 234, the retaining member 260) that allow it to be captured by the surrounding CMC material. The insert may include knives (e.g., the knives 262) which may be machined in or formed in advance.

In yet another example, the CMC tip shroud (e.g., the tip shroud 320) of a shrouded blade (e.g., the turbine blade 310) may hold individual monolithic ceramic knife inserts (e.g., the protective crowns 326A, 326B).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade adapted for use in a gas turbine engine, the turbine blade comprising
    an airfoil comprising ceramic matrix composite materials including ceramic-containing reinforcements suspended in ceramic-containing matrix material, the airfoil having a radially-inner end portion, a radially-outer end portion, and a body portion that extends from the radially-inner end portion to the radially-outer end portion,
    a protective crown comprising entirely ceramic-containing materials mounted to the radially-outer end portion of the airfoil, the protective crown configured to provide a radially-outermost surface of the turbine blade such that the protective crown is positioned to engage a blade track or other structure radially outward of the airfoil upon use of the turbine blade in the gas turbine engine so that the ceramic matrix composite materials of the airfoil are protected from rub that could remove barrier coatings and expose the ceramic matrix materials of the airfoil to the environment which can damage the ceramic matrix materials of the airfoil, and
    a crown retainer configured to block motion of the protective crown in a radial direction relative to the airfoil, the crown retainer including a flange incorporated into either the airfoil or the protective crown that is received in a flange-receiving channel formed in the other of the airfoil or the protective crown,
    wherein the ceramic containing materials of the protective crown are different from the ceramic matrix composite materials of the airfoil, wherein the protective crown, wherein the outermost surface forms a squealer tip having an axially extending first side rail portion and an axially extending second side rail portion, and a cavity extends circumferentially between the axially extending first side rail portion and the axially extending second side rail portion, wherein the protective crown is shaped to include a tip portion that extends radially outward of the airfoil to provide the radially-outermost surface of the turbine blade and a tip mount that radially overlaps the radially-outer end portion of the airfoil, wherein the flange of the crown retainer is incorporated into the protective crown and the flange-receiving channel of the crown retainer is formed in the airfoil, and wherein the tip mount of the protective crown is received in a mount aperture extending in the radial direction through the radially-outer end portion of the airfoil and the flange-receiving channel extends into the radially-outer end portion or the body portion of the airfoil from the mount aperture, and the flange extends outwardly from the tip mount into the flange-receiving channel.

2. The turbine blade of claim 1, wherein the crown retainer, and the airfoil are co-processed together to form an integral, single-piece component.

3. The turbine blade of claim 2, wherein the protective crown comprises entirely monolithic ceramic materials.

4. The turbine blade of claim 3, wherein the protective crown provides the entirety of the radially outer-most surface of the turbine blade.

5. The turbine blade of claim 1, wherein the protective crown provides the entirety of the radially outer-most surface of the turbine blade.

6. The turbine blade of claim 1, wherein the protective crown comprises entirely monolithic ceramic materials.

7. A turbine blade adapted for use in a gas turbine engine, the turbine blade comprising
    an airfoil comprising ceramic matrix composite materials including ceramic-containing reinforcements suspended in ceramic-containing matrix material, the airfoil having a radially-inner end portion, a radially-outer end portion, and a body portion that extends from the radially-inner end portion to the radially-outer end portion, a protective crown comprising entirely ceramic-containing materials mounted to the radially-outer end portion of the airfoil, the protective crown configured to provide a radially-outermost surface of the turbine blade such that the protective crown is positioned to engage a blade track or other structure radially outward of the airfoil upon use of the turbine blade in the gas turbine engine so that the ceramic matrix composite materials of the airfoil are protected from rub that could remove barrier coatings and expose the ceramic matrix materials of the airfoil to the environment which can damage the ceramic matrix materials of the airfoil, and a crown retainer configured to block motion of the protective crown in a radial direction relative to the airfoil, the crown retainer including a flange incorporated into either the airfoil or the protective crown that is received in a flange-receiving channel formed in the other of the airfoil or the protective crown, wherein the ceramic containing materials of the protective crown are different from the ceramic matrix composite materials of the airfoil, wherein the outermost surface forms a squealer tip having an axially extending first side rail portion and an axially extending second side rail portion, and a cavity extends circumferentially between the axially extending first side rail portion and the axially extending second side rail portion, wherein the protective crown is shaped to include a tip portion that extends radially outward of the airfoil to provide the radially-outermost surface of the turbine blade and a tip mount that radially overlaps the radially-outer end portion of the airfoil, wherein the flange of the crown retainer is incorporated into the airfoil and the flange-receiving channel of the crown retainer is formed in the protective crown, and wherein the radially-outer end portion of the airfoil comprises a central stud extending radially outward of the body portion of the airfoil and the flange extends outwardly from the central stud, and the tip mount of the protective crown includes a mount aperture that receives the central stud of the airfoil and the flange-receiving channel extends into the tip mount from the mount aperture and around the flange.

8. The turbine blade of claim 7, wherein the crown retainer, and the airfoil are co-processed together to form an integral, single-piece component.

9. The turbine blade of claim 8, wherein the protective crown comprises entirely monolithic ceramic materials.

10. The turbine blade of claim 9, wherein the protective crown provides the entirety of the radially outer-most surface of the turbine blade.

11. The turbine blade of claim 7, wherein the protective crown provides the entirety of the radially outer-most surface of the turbine blade.

12. The turbine blade of claim 7, wherein the protective crown comprises entirely monolithic ceramic materials.

13. A turbine blade adapted for use in a gas turbine engine, the turbine blade comprising an airfoil comprising ceramic matrix composite materials including ceramic-containing reinforcements suspended in ceramic-containing matrix material, the airfoil having a radially-inner end portion, a radially-outer end portion, and a body portion that extends from the radially-inner end portion to the radially-outer end portion, a protective crown comprising entirely ceramic-containing materials mounted to the radially-outer end portion of the airfoil, the protective crown configured to provide a radially-outermost surface of the turbine blade such that the protective crown is positioned to engage a blade track or other structure radially outward of the airfoil upon use of the turbine blade in the gas turbine engine so that the ceramic matrix composite materials of the airfoil are protected from rub that could remove barrier coatings and expose the ceramic matrix materials of the airfoil to the environment which can damage the ceramic matrix materials of the airfoil, and a crown retainer configured to block motion of the protective crown in a radial direction relative to the airfoil, the crown retainer including a flange incorporated into either the airfoil or the protective crown that is received in a flange-receiving channel formed in the other of the airfoil or the protective crown, wherein the ceramic containing materials of the protective crown are monolithic ceramic materials that are different from the ceramic matrix composite materials of the airfoil, wherein the protective crown, the crown retainer, and the airfoil are co-processed to form an integral, single-piece component, wherein the outermost surface of the protective crown forms a squealer tip and provides the entirety of the radially outermost surface of the turbine blade such that the radially outermost surface of the airfoil is located inward of the outermost surface of the protective crown thereby being arranged to avoid contact with components radially outward of the turbine blade.

14. The turbine blade of claim 13, wherein the protective crown is shaped to include a tip portion that extends radially outward of the airfoil to provide the radially-outermost surface of the turbine blade and a tip mount that radially overlaps the radially-outer end portion of the airfoil.

15. The turbine blade of claim 14, wherein the flange of the crown retainer is incorporated into the protective crown and the flange-receiving channel of the crown retainer is formed in the airfoil.

16. The turbine blade of claim 15, wherein the tip mount of the protective crown is received in a mount aperture extending in the radial direction through the radially-outer end portion of the airfoil and the flange-receiving channel extends into the radially-outer end portion or the body portion of the airfoil from the mount aperture, and the flange extends outwardly from the tip mount into the flange-receiving channel.

17. The turbine blade of claim 14, wherein the flange of the crown retainer is incorporated into the airfoil and the flange-receiving channel of the crown retainer is formed in the protective crown.

18. The turbine blade of claim 17, wherein the radially-outer end portion of the airfoil comprises a central stud extending radially outward of the body portion of the airfoil and the flange extends outwardly from the central stud, and the tip mount of the protective crown includes a mount aperture that receives the central stud of the airfoil and the flange-receiving channel extends into the tip mount from the mount aperture and around the flange.

\* \* \* \* \*